(12) United States Patent
Kawami et al.

(10) Patent No.: US 11,712,101 B2
(45) Date of Patent: Aug. 1, 2023

(54) REPLACEMENT TYPE CONTAINER

(71) Applicant: YOSHINO KOGYOSHO CO., LTD., Tokyo (JP)

(72) Inventors: Tatsuya Kawami, Ibaraki (JP); Kazumi Azuma, Ibaraki (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 94 days.

(21) Appl. No.: 17/440,859

(22) PCT Filed: Mar. 9, 2020

(86) PCT No.: PCT/JP2020/009945
§ 371 (c)(1),
(2) Date: Sep. 20, 2021

(87) PCT Pub. No.: WO2020/240975
PCT Pub. Date: Dec. 3, 2020

(65) Prior Publication Data
US 2022/0160100 A1    May 26, 2022

(30) Foreign Application Priority Data

May 31, 2019   (JP) ................. 2019-103144

(51) Int. Cl.
*A45D 40/00*      (2006.01)
*B65D 77/04*      (2006.01)

(52) U.S. Cl.
CPC ..... *A45D 40/0068* (2013.01); *B65D 77/0486* (2013.01)

(58) Field of Classification Search
CPC ................. B65D 5/66; B65D 5/0085; B65D 2577/00–042; B65D 50/041;
(Continued)

(56) References Cited

U.S. PATENT DOCUMENTS 4,459,793 A *  7/1984  Zenger ................. B65D 25/18
                                                   53/469
4,466,553 A *  8/1984  Zenger ................. B65D 25/18
                                                   220/666
(Continued)

FOREIGN PATENT DOCUMENTS

CN    107878611 A    4/2018
CN    207684125 U    8/2018
(Continued)

OTHER PUBLICATIONS

Jul. 11, 2022 Office Action issued in Chinese Application No. 202080023481.1.
(Continued)

*Primary Examiner* — Kareen K Thomas
(74) *Attorney, Agent, or Firm* — Oliff PLC

(57) ABSTRACT

A replacement type container that facilitates an operation of separating an inner container and prevents an outer container from dropping off at the time of latching release of an engagement portion. The replacement type container includes an inner container that houses a content, an outer container that houses the inner container, and a cap attached to the inner container.

6 Claims, 5 Drawing Sheets

(58) Field of Classification Search
CPC .. B65D 21/048; B65D 21/04; B65D 77/0486; A45D 40/0068; A45D 2034/005; A45D 2200/05
See application file for complete search history.

(56) References Cited

U.S. PATENT DOCUMENTS

| | | | | |
|---|---|---|---|---|
| 4,746,025 A | * | 5/1988 | Krautkramer | B29C 66/131 215/253 |
| 5,052,568 A | * | 10/1991 | Simon | B65D 51/20 215/250 |
| 5,356,026 A | * | 10/1994 | Andress | B65D 21/0233 206/508 |
| 5,435,460 A | * | 7/1995 | Osgar | B65D 85/84 222/105 |
| 5,566,864 A | * | 10/1996 | Stolz | B65D 47/122 222/529 |
| 5,641,099 A | * | 6/1997 | McLelland | B65D 47/063 222/541.9 |
| 5,788,100 A | * | 8/1998 | Sturk | B65D 47/103 222/541.9 |
| 5,823,377 A | * | 10/1998 | Krautkramer | B65D 47/063 215/256 |
| 5,967,376 A | * | 10/1999 | McLelland | B65D 47/103 222/530 |
| 6,450,357 B1 | * | 9/2002 | Krautkramer | B65D 47/063 220/257.1 |
| 2011/0056866 A1 | | 3/2011 | Thiebault | |
| 2018/0242710 A1 | * | 8/2018 | Ki | A45D 33/006 |

FOREIGN PATENT DOCUMENTS

| | | |
|---|---|---|
| JP | H06-80630 U | 11/1994 |
| JP | H10-129724 A | 5/1998 |
| JP | 2010-173724 A | 8/2010 |
| JP | 2010-195484 A | 9/2010 |
| JP | 2011-157083 A | 8/2011 |

OTHER PUBLICATIONS

Apr. 14, 2020 International Search Report issued in International Patent Application No. PCT/JP2020/009945.
Apr. 14, 2020 Written Opinion issued in International Patent Application No. PCT/JP2020/009945.
Nov. 14, 2022 Office Action issued in Japanese Patent Application No. 2019-103144.
Jan. 4, 2023 extended Search Report issued in European Patent Application No. 20813207.6.

* cited by examiner

REPLACEMENT TYPE CONTAINER

TECHNICAL FIELD

The present invention relates to a replacement type container including an outer container in which an inner container is detachably housed, for use.

BACKGROUND ART

As this kind of replacement type container, for example, a composition including an inner container for storing a content such as a cream and an outer container for storing the inner container is known, as described in Patent Literature 1. The inner container serves as a refill container removable from the outer container, and the outer container can be reused by the consumer by removing the inner container stored in the outer container and replacing it with a new inner container.

The inner container described in Patent Literature 1 has an outer circumferential portion provided with a press portion extending downward. The press portion serves as a tabular piece that turns, due to an inward press in the radial direction of the inner container by a finger or the like, inward in the radial direction with its upper end as the fulcrum, and such press portions are provided at an interval of 180 degrees in the circumferential direction on both sides of the circumferential wall portion of the inner container. An outer face of the press portions is provided with an engagement portion protruding outward in the radial direction.

Meanwhile, in an upper portion of a peripheral wall of the outer container, an engagement projecting portion that protrudes inward and engages with the press portion is provided. The engagement portion is engaged with the engaging protrusion while getting over the engaging protrusion.

CITATION LIST

Patent Literature

Patent Literature 1: JP 2010-195484 A

SUMMARY OF INVENTION

Technical Problem

However, regarding the replacement type container described in Patent Literature 1, when each press portion having the fulcrum at the upper end is pressed inward in the radial direction in order to remove the inner container from the outer container, the upper end portion of each press portion is regulated in movement due to the fulcrum and additionally the lower end portion of each press portion is regulated in inward movement in the radial direction, in abutment with a protrusion stripe provided at the outer container. Thus, at the time of pulling of the inner container from the outer container, because each engagement portion is engaged lightly with the engagement projecting portion, each engagement portion is less likely to get over the engagement projecting portion.

Release of the engagement of each engagement portion due to a press operation on each press portion without holding the outer container at the time of removal of the inner container causes the outer container to be likely to drop off the inner container.

The present invention has been made in order to solve the problem in the related art, and an object of the present invention is to provide a replacement type container that facilitates an operation of separating an inner container and prevents an outer container from dropping off the inner container at the time of engagement release of an engagement portion.

Solution to Problem

In order to solve the problem, according to an aspect of the present invention, provided is a replacement type container including: an inner container that is tubular in shape with a bottom and houses a content; an outer container that houses the inner container; and a cap detachably attached to a mouth of the inner container, wherein the outer container has an outer circumferential portion provided with a cut-away portion that extends downward from an upper end of the outer circumferential portion and penetrates in a container radial direction, a tabular press portion extending in an up-and-down direction and projecting upward from an upper end of the cut-away portion is provided in the cut-away portion, with the tabular press portion having, as fulcrums, a support connected between an end face on both sides in a circumferential direction and an inner face on both sides in the circumferential direction of the cut-away portion, an upper side of the tabular press portion turns inward in the container radial direction due to a press on the upper side of the tabular press portion and additionally a lower side of the tabular press portion turns outward in the container radial direction, the lower side of the tabular press portion has an inner face provided with a latch projecting portion protruding to the inner container, the inner container has an outer circumferential portion provided with an insertion recessed portion enabling insertion of the upper side of the tabular press portion that turns inward in the container radial direction and an engagement recessed portion that is recessed inward in the container radial direction below the insertion recessed portion and is latchable with the latch projecting portion, and due to movement of the upper side of the tabular press portion into the insertion recessed portion due to the press, latching between the engagement recessed portion and the latch projecting portion is released.

When the upper side of the tabular press portion is pressed to the inner container side, with the tabular press portion having the fulcrums, the upper side of the tabular press portion turns into the insertion recessed portion and additionally the lower side of the tabular press portion turns outward in the container radial direction. Therefore, the latch projecting portion is separated from the engagement recessed portion, and the engagement recess portion releases the latching state of the latch projecting portion. Thus, the inner container can be easily pulled from the outer container. Because the tabular press portion is provided at the outer container, in a case where the upper side of the tabular press portion is pressed to the inner container side at the time of removal of the inner container, a press operation can be made on the tabular press portion with the outer container being held. Thus, when the engagement of the engagement recessed portion is released due to a press operation on the tabular press portion, the outer container does not drop off because the outer container is held through the tabular press portion.

An inclined face sloping upward from inside to outside in longitudinal sectional view is provided on an inner upper-end corner in the container radial direction of the insertion recessed portion, and when the upper side of the tabular press portion turns inward in the container radial direction due to the press, an inner upper end corner of the tabular press portion may come into contact with the inclined face to move the inside container upward.

In this case, when the inner upper-end corner of the tabular press portion abuts on the inclined face, a pressing force that is orthogonal to the inclined face through the point of contact between the inner upper-end corner and the inclined face and orients from the side on which the point of contact is located to the opposite side acts on the inclined face. The pressing force orients upward, so that the inner container can move upward relatively to the outer container.

Due to upward movement of the inside container due to the abutment of the inner upper-end corner of the tabular press portion on the inclined face, the engagement recessed portion may move to a position enabling getting over the latch projecting portion.

In this case, because the engagement recessed portion moves to the position enabling getting over the latch projecting portion due to the upward movement of the inner container to the outer container due to the abutment of the inner upper-end corner of the tabular press portion on the inclined face, even when the press operation on the tabular press portion stops, the engagement recessed portion does not engage with the latch projecting portion. Therefore, simply, an operation of pulling the inner container from the outer container enables the inner container to be pulled out, so that an operation of pulling out the inner container can be further facilitated.

The outer circumferential portion of the outer container may have a rib that extends in the up-and-down direction, with a gap outside the tabular press portion in the container radial direction in a state in which the tabular press portion is not press operated.

In this case, an increase in the pressing force acting on the press member causes an increase in the angle of torsion of the support, so that the support is likely to be damaged. Thus, because the rib extending in the up-and-down direction with the gap outside the tabular press portion in the container radial direction is provided on the outer circumferential portion of the outer container, contact of the lower side of the tabular press portion with the rib enables limitation of the angle of rotation of the press member. Thus, the angle of torsion of the support is inhibited, so that the support can be prevented from being damaged.

Advantageous Effects of Invention

According to the present invention, a replacement type container that facilitates an operation of pulling out an inner container and prevents an outer container from dropping off the inner container at the time of engagement release of an engagement portion can be provided.

BRIEF DESCRIPTION OF DRAWINGS

FIG. 5 illustrates explanatory views for examples of the outer container of the replacement type container according to the present invention, in which FIG. 5(a) is a plan view of the outer container and FIG. 5(b) is a sectional view of half of the outer container viewed along arrow VIb of FIG. 5(a).

DESCRIPTION OF EMBODIMENTS

A replacement type container according to an embodiment of the present invention will be described below with reference to the drawings. The replacement type container according to the present embodiment is capable of housing a cosmetic content, such as cream.

Figure 1:
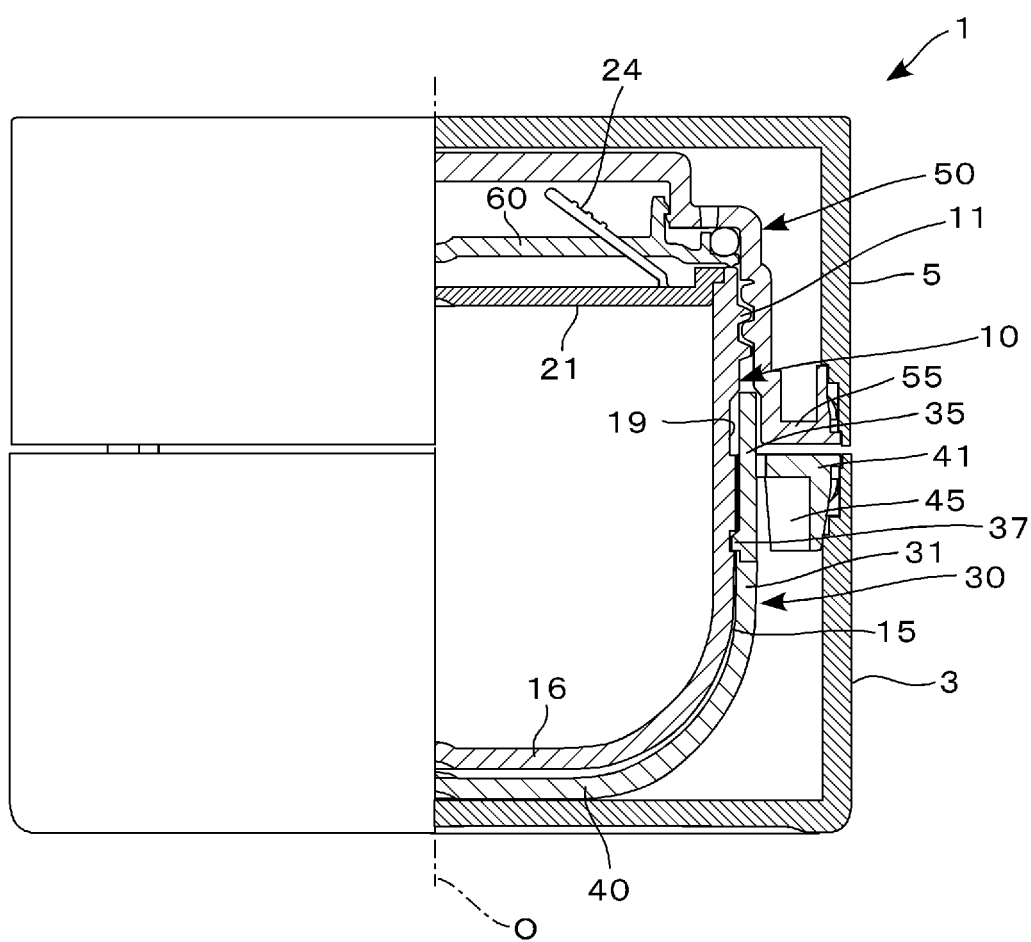
FIG. 1 is a sectional view of half of a replacement type container according to an embodiment of the present invention.

In the following description, regarding the drawings, the direction along a container axis O illustrated in FIG. 1 is referred to as the "axial direction", and the radial direction centering the container axis O is simply referred to as the "radial direction". The circumferential direction centering the container axis O is referred to as the "circumferential direction". As illustrated in FIG. 1, in the axial direction, the side on which a cap is located to an inner container is referred to as the "upper side" and the opposite side is referred to as the "lower side".

As illustrated in FIG. 1, the replacement type container 1 according to the present embodiment includes an inner container 10, an outer container 30, and a cap 50. In the present embodiment, the replacement type container 1 further includes an outer case 3 and an outer cap 5. The inner container 10 is tubular in shape with a bottom and houses a content. The outer container 30 houses the inner container 10. The cap 50 is detachably attached to a mouth 11 of the inner container 10. The replacement type container 1 is formed, for example, by injection molding with a synthetic resin material. Each constituent member will be described in detail below.

<Outer Container 30>

Figure 2:
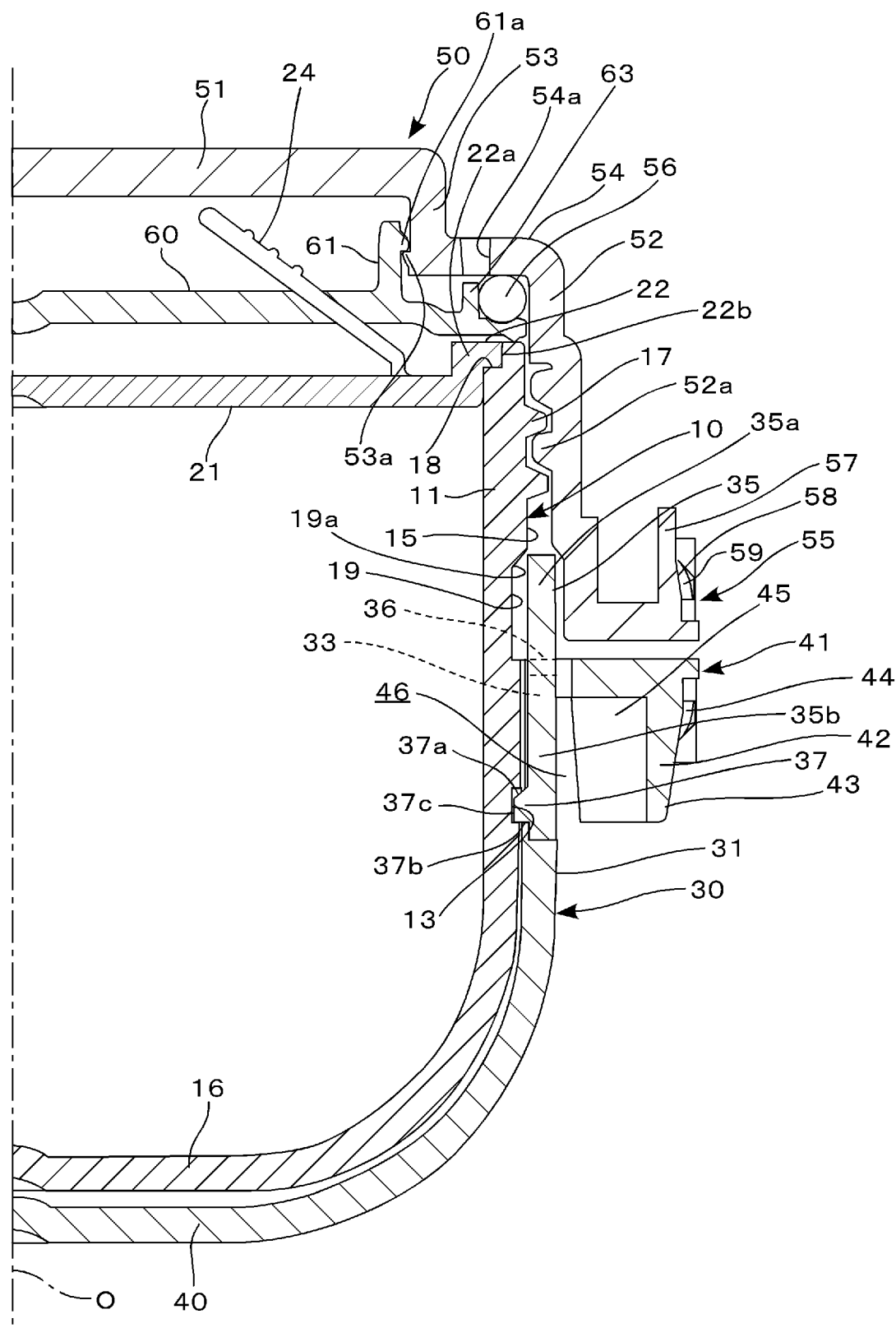
FIG. 2 is a partial longitudinal sectional view of the replacement type container.

As illustrated in FIG. 2, the outer container 30 is tubular in shape with a bottom and has an upper portion provided with an opening. In the present embodiment, the outer container 30 has an outer circumferential portion 31 cylindrical in shape and a bottom portion 40 that is connected to the lower end of the outer circumferential portion 31 and is circular in shape in plan view. The bottom portion 40 has a circumferential edge portion curving upward from inside to outside in the radial direction.

Figure 3:
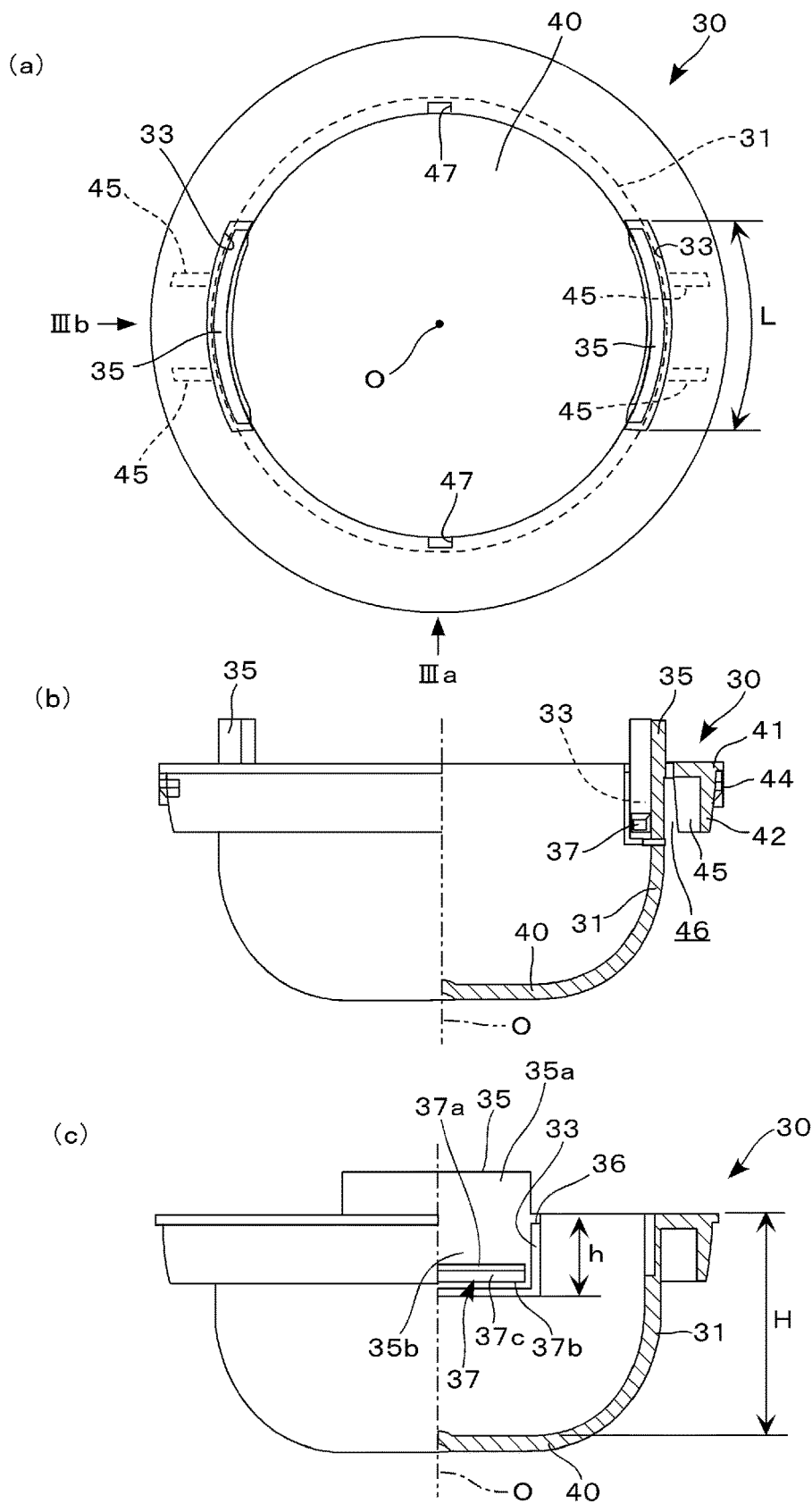
FIG. 3(a) is a plan view of an outer container.
FIG. 3(b) is a sectional view of half of the outer container viewed along arrow IIIa of FIG. 3(a)
FIG. 3(c) is a sectional view of half of the outer container viewed along arrow IIIb of FIG. 3(a).

As illustrated in FIGS. 3(a) and 3(c), the outer circumferential portion 31 of the outer container 30 is provided with cut-away portions 33 each extending downward from the upper end of the outer circumferential portion 31 and penetrating in the radial direction. In the present embodiment, within the outer circumferential portion 31 of the outer container 30, the cut-away portions 33 are provided one-to-one on the left and right sides of the outer circumferential portion 31. The cut-away portions 33 each have a predetermined length L in the circumferential direction. Thus, the cut-away portions 33 curve in plan view. The cut-away portions 33 each have a depth h that is approximately one-third of the depth H of the outer container.

In each cut-away portion 33, provided is a tabular press portion 35 that extends in the up-and-down direction and projects upward from the upper end of the cut-away portion 33. As illustrated in FIGS. 3(a), 3(b), and 3(c), in plan view, the tabular press portion 35 extends in the circumferential direction along the cut-away portion 33. Thus, the tabular press portion 35 curves in plan view. As illustrated in FIG. 3(c), the tabular press portion 35 viewed along arrow IIIb of FIG. 3(a) is rectangular and oblong in shape. The tabular press portion 35 is disposed with a gap inside the inner face of the cut-away portion 33.

As illustrated in FIG. 3(c), the tabular press portion 35 is capable of turning in the radial direction with, as fulcrums, a support 36 connected between the end face on both sides in the circumferential direction of the tabular press portion 35 and the inner face on both sides in the circumferential direction of the cut-away portion 33. An inward press on the upper side 35a of the tabular press portion 35 in the radial direction causes the upper side 35a of the tabular press portion 35 to turn inward in the radial direction and causes the lower side 35b of the tabular press portion 35 to turn outward in the radial direction. Note that the upper side 35a of the tabular press portion 35 corresponds to the portion higher than the supports 36 of the tabular press portion 35. The lower side 35b of the tabular press portion 35 corresponds to the portion lower than the supports 36 of the tabular press portion 35.

In the present embodiment, each support 36 is connected between the upper portion of each end face on both sides in the circumferential direction of the tabular press portion 35 and the upper portion of each inner face on both sides in the circumferential direction of the cut-away portion 33. Note that the tabular press portion 35 and the supports 36 are integrally formed as part of the outer container 30.

Figure 4:
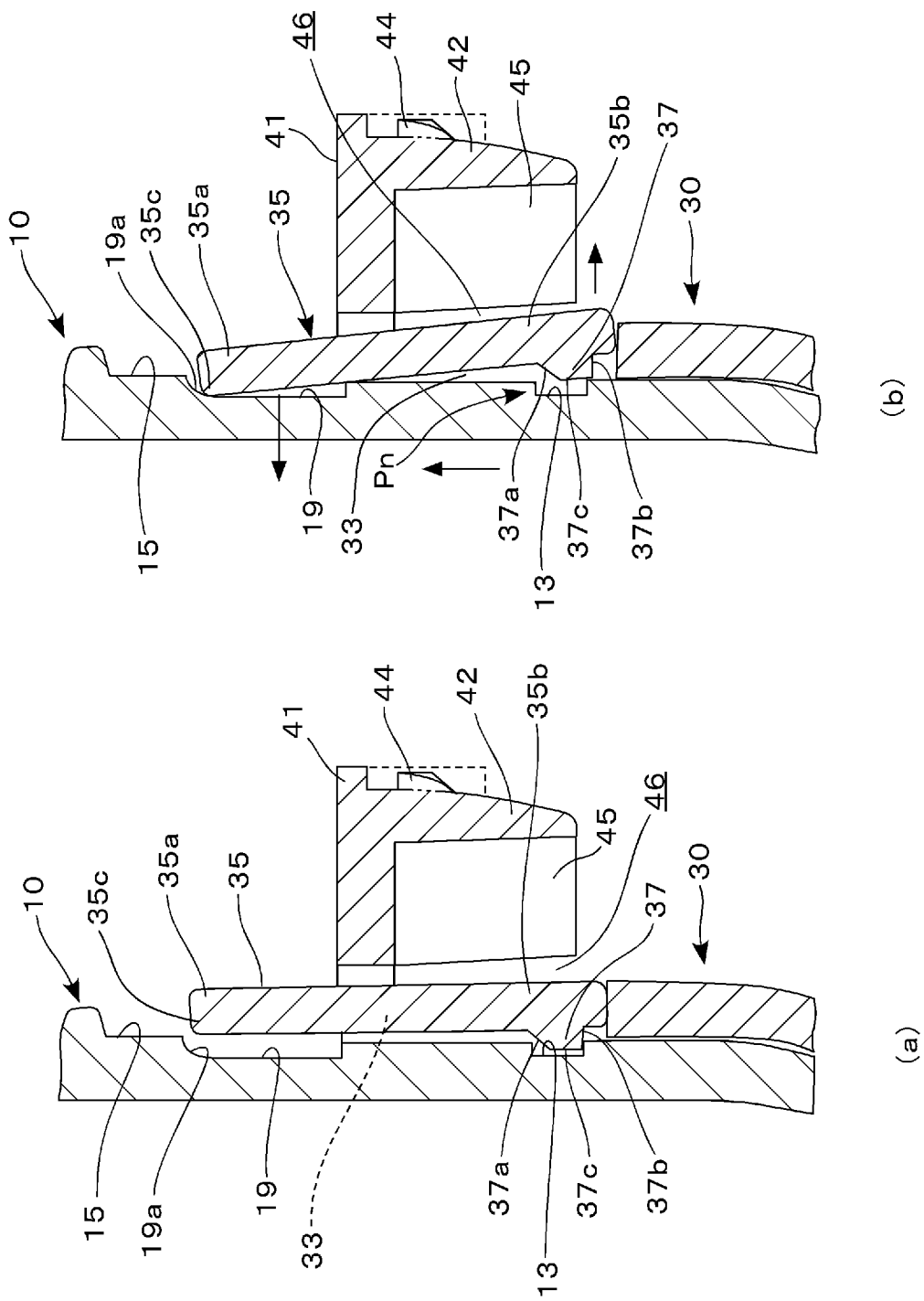
FIG. 4 illustrates explanatory views for a turn of a tabular press portion and movement of an inner container.

The lower side 35b of the tabular press portion 35 has an inner face provided with a latch projecting portion 37 protruding to the inner container 10. As illustrated in FIGS. 3(c) and 4(a), the latch projecting portion 37 extends in the circumferential direction of the inner face of the tabular press portion 35. The latch projecting portion 37 has an upper portion having an inclined face 37a sloping upward from below and outward in the radial direction. The latch projecting portion 37 has a lower portion provided with an abutment face 37b extending in the radial direction. Furthermore, a planar portion 37c extends in the axial direction between the inclined face 37a and the abutment face 37b, connecting them. The abutment face 37b abuts on the inner face of an engagement recessed portion 13 provided at the inner container 10.

Note that, as illustrated in FIGS. 4(a) and 4(b), in a case where the inner container 10 is inserted into the outer container 30, the outer face of an outer circumferential portion 15 of the inner container 10 moves slidingly on the planar portion 37c of the latch projecting portion 37, and in this case, with the tabular press portion 35 having the supports 36 as fulcrums, the lower side 35b of the tabular press portion 35 turns farther from the inner container 10 and the upper side 35a of the tabular press portion 35 turns closer to the inner container 10. Thus, contact of the upper side 35a of the tabular press portion 35 with the outer face of the outer circumferential portion 15 of the inner container 10 makes the inner container 10 difficult to insert. Therefore, while the outer circumferential portion 15 of the inner container 10 are sliding on the planar portion 37c of the latch projecting portion 37, the tabular press portion 35 is configured such that the upper side 35a of the tabular press portion 35 is located, in the radial direction, outside the outer circumferential portion 15 of the inner container 10.

As illustrated in FIG. 2, the outer circumferential portion 31 of the outer container 30 has an upper portion provided with a first flange 41 that is annular in shape and protrudes outward in the radial direction. The leading end portion in the radial direction of the first flange 41 is provided with a first fitting tubular portion 42 protruding downward. The first fitting tubular portion 42 has, as its outer face, a first inclined face 43 sloping downward from above and inward in the radial direction. The first inclined face 43 facilitates attachment of the outer case 3 illustrated in FIG. 1. The first inclined face 43 is provided with a latch projecting portion 44 protruding outward in the radial direction. The latch projecting portion 44 engages with an engagement recessed portion not illustrated provided on the inner face of the outer case 3, so that the outer case 3 is engaged with the first flange 41 of the outer container 30.

Regarding the first flange 41, the inner face of the first flange 41 opposed to the tabular press portion 35 is provided with a rib 45 that extends downward in connection with the lower face of the first flange 41 and the inner face of the first fitting tubular portion 42. The rib 45 has a lower end extending to a position at a level substantially flush with the lower end face of the first fitting tubular portion 42. With no press operation on the tabular press portion 35, the inner face of the rib 45, on the side on which the tabular press portion 35 is located, is opposed, through a gap 46, to the outer face of the tabular press portion 35. Thus, with no press operation on the tabular press portion 35, the tabular press portion 35 is not in contact with the rib 45. The size of the gap 46 is set in consideration of an allowable angle of torsion enabling prevention of the supports 36 from being damaged due to an increase in the angle of torsion of the supports 36 at the time of turning of the tabular press portion 35 due to a press. In the present embodiment, as illustrated in FIG. 3(a), two ribs 45 are disposed at an interval in the circumferential direction, corresponding to each tabular press portion 35.

The outer circumferential portion 31 of the outer container 30 has an inner face provided with latch recessed portions 47 formed by opening the upper end and inner surface of the outer peripheral portion 31 and recessing downward. In the present embodiment, in plan view, the latch recessed portions 47 are arranged at a position displaced by 90° in the circumferential direction with respect to each tabular press portion 35. Latch projecting portions not illustrated provided on the outer face of the outer circumferential portion 15 of the inner container 10 fit one-to-one in the latch recessed portions 47, so that the inner container 10 and the outer container 30 are integrally coupled together in the circumferential direction.

<Inner Container 10>

As illustrated in FIG. 2, the inner container 10 is tubular in shape with a bottom and has an upper portion provided with an opening. In the present embodiment, the inner container 10 has the outer circumferential portion 15 cylindrical in shape and a bottom portion 16 that is connected to the lower end of the outer circumferential portion 15 and is circular in shape in plan view. The bottom portion 16 has a circumferential edge portion curving in a direction protruding outward in the radial direction. The inner container 10 is similar in shape to the outer container 30 and is smaller than the outer container 30. Thus, the inner container 10 is housable in the outer container 30. With the inner container 10 housed in the outer container 30, the mouth 11 on the upper side of the outer circumferential portion 15 of the inner container 10 projects from the upper end portion of the outer container 30. The mouth 11 of the inner container 10 has an outer face provided with a male thread portion 17. The cap 50 screws with the male thread portion 17. A hook step 18 recessed downward is provided on the inside of the upper end portion of the mouth 11. An inner lid 21 is detachably attached to the hook step 18.

(Insertion Recessed Portion 19)

As illustrated in FIGS. 2 and 4(a), the outer circumferential portion 15 of the inner container 10 is provided with an insertion recessed portion 19 enabling insertion of the upper side 35a of the tabular press portion 35 that turns inward in the radial direction. In the present embodiment, the insertion recessed portion 19 is provided at a position of the outer circumferential portion 15 of the inner container 10 facing the upper side 35a of the tabular press portion 35. The insertion recessed portion 19 is rectangular and oblong in shape in side view. The insertion recessed portion 19 extends upward from the level flush with the upper face of the first flange 41 of the outer container 30 and extends to a level slightly above the upper face of the tabular press portion 35 with no press operation. The insertion recessed portion 19 is longer in the circumferential direction than the tabular press portion 35. Thus, when the tabular press portion 35 turns to the inner container 10 side due to a press operation, the upper side 35a of the tabular press portion 35 can be inserted into the insertion recessed portion 19.

(Inclined Face 19a)

As illustrated in FIG. 4(a), the upper-end corner on the inside in the radial direction of the insertion recessed portion 19 is provided with an inclined face 19a sloping upward from inside to outside in longitudinal sectional view. In the present embodiment, the inclined face 19a serves as a curved face curving in an upward protruded shape from inside to outside. The inclined face 19a has a predetermined radius of curvature. When an inner upper-end corner 35c of the tabular press portion 35 that turns inward in the radial direction is pressed against the inclined face 19a, the inner container 10 moves upward relatively to the outer container 30. A press effect between the inclined face 19a and the tabular press portion 35 will be described in detail later. Note that the inclined face 19a does not necessarily curve in an upward protruded shape from inside to outside, and thus may extend linearly upward from inside to outside.

(Engagement Recessed Portion 13)

As illustrated in FIGS. 4(a) and 4(b), the outer circumferential portion 15 of the inner container 10 is provided with the engagement recessed portion 13 recessed inward in the radial direction, below the insertion recessed portion 19. The engagement recessed portion 13 is latchable with the latch projecting portion 37. In the present embodiment, the engagement recessed portion 13 is provided at a position of the outer circumferential portion 15 of the inner container 10 facing the latch projecting portion 37 provided on the tabular press portion 35. The engagement recessed portion 13 is rectangular and oblong in shape in side view. The engagement recessed portion 13 is longer in the up-and-down direction than the latch projecting portion 37. The engagement recessed portion 13 is longer in the circumferential direction than the latch projecting portion 37. The position in the up-and-down direction of the engagement recessed portion 13 to the outer circumferential portion 15 of the inner container 10 is set such that the latching with the latch projecting portion 37 can be released at the time of movement of the tabular press portion 35 into the insertion recessed portion 19 due to a press.

As illustrated in FIG. 4(b), due to pressing of the inner upper-end corner 35c of the tabular press portion 35 and upward movement of the inner container 10 relative to the outer container 30, the engagement recessed portion 13 moves to a position Pn enabling getting over the latch projecting portion 37. In the present embodiment, the position Pn enabling getting over corresponds to the position at which the lower end portion of the engagement recessed portion 13 is opposed to the planar portion 37c of the latch projecting portion 37. Thus, at the time of upward pulling of the inner container 10, the engagement recessed portion 13 is not caught by the latch projecting portion 37. Therefore, the inner container 10 can be easily pulled from the outer container 30.

Note that the position Pn enabling getting over is not limited to the position at which the lower end portion of the engagement recessed portion 13 is opposed to the planar portion 37c of the latch projecting portion 37, and thus may correspond to the position opposed to the inclined face 37a of the latch projecting portion 37 or the position opposed to the inner face higher than the latch projecting portion 37 of the tabular press portion 35.

(Inner Lid 21)

As illustrated in FIG. 2, the inner lid 21 circular in shape is detachably attached to the hook step 18 provided at the upper end portion of the outer circumferential portion 15 of the inner container 10. The inner lid 21 has a circumferential edge portion provided with a hook portion 22 that the hook step 18 hooks together. The hook portion 22 has a protruding portion 22a that is annular in shape and extends upward from the circumferential edge portion of the inner lid 21 and a hook protruding portion 22b that is annular in shape and extends outward in the radial direction from the upper end portion of the protruding portion 22a. The outer diameter of the hook protruding portion 22b is smaller than the inner diameter of the inner circumferential face that is annular in shape and extends upward from the hook step 18. Therefore, with the hook protruding portion 22b having a lower face placed on the hook step 18, the inner lid 21 is detachably attached to the upper end portion of the inner container 10. The inner lid 21 has an upper face provided with a grip 24.

<Cap 50>

As illustrated in FIG. 2, the cap 50 has a top wall portion 51 opposed to the opening of the inner container 10 and an outer wall portion 52 that is tubular in shape and extends downward from the circumferential edge portion of the top wall portion 51. The top wall portion 51 is circular in shape in plan view, and the circumferential edge portion of the top wall portion 51 is provided with a press step 54 that is located below the top wall portion and extends annularly in the circumferential direction. The press step 54 has a lower face having contact with the upper end of the mouth 11 of the inner container 10 through a hermetic seal 56 (in the present embodiment, an O-ring) and a sealing lid 60. The press step 54 is provided with a hole 54a for air passage penetrating in the up-and-down direction.

The press step 54 has a circumferential edge portion provided with the outer wall portion 52 extending downward. The outer wall portion 52 is located, in the radial direction, outside the mouth 11 of the inner container 10 and the upper side 35a of the tabular press portion 35. The outer wall portion 52 has an inner face provided with a female thread portion 52a capable of screwing with the male thread portion 17. The outer wall portion 52 has a lower portion provided with a second flange 55 that is annular in shape and protruding outward in the radial direction. A second fitting tubular portion 57 protruding upward is provided on the outside in the radial direction of the second flange 55. The second fitting tubular portion 57 has, as its outer face, a second inclined face 58 sloping upward from below and inward in the radial direction. The second inclined face 58 facilitates attachment of the outer cap 5 illustrated in FIG. 1. The second inclined face 58 is provided with a latch projecting portion 59 protruding outward in the radial direction. The latch projecting portion 59 engages with an engagement recessed portion not illustrated provided on the inner face of the outer cap 5, so that the outer cap 5 can engage with the second flange 55 of the cap 50.

(Sealing Lid 60)

As illustrated in FIG. 2, the sealing lid 60 opposed to the opening of the inner container 10 is provided inside the cap 50. The sealing lid 60 is circular in shape in axial view and is attached inside the cap 50. The sealing lid 60 has an upper face provided with a latch protruding portion 61 and an attachment projecting portion 63 at an interval from inside to outside in the radial direction.

The latch protruding portion 61 is tubular in shape and protrudes from the upper face of the sealing lid 60 to the top wall portion 51 of the cap 50, and a latch protrusion 61a is provided on the outside of the latch protruding portion 61. The latch protrusion 61a engages with an engagement protrusion 53a provided on the inner face of a circumferential wall 53 extending upward from the inside of the press step 54 of the cap 50, resulting in connection of the sealing lid 60 to the cap 50. The attachment projecting portion 63 is tubular in shape and protrudes from the upper face of the sealing lid 60 to the press step 54, and the hermetic seal 56 is disposed, in the radial direction, outside the attachment projecting portion 63.

(Function and Effect of Replacement Type Container 1)

Next, the function of the replacement type container 1 according to the present invention will be described.

First, a case where the inner container 10 is removed from the outer container 30 will be given. In the present embodiment, described will be removal of the inner container 10 from the outer container 30 housing the inner container 10 with the inner lid 21 attached to the mouth 11 of the inner container 10 and the cap 50 attached to the inner container 10, as illustrated in FIG. 2.

For removal of the inner container 10, first, the cap 50 is removed from the inner container 10 by rotation of the cap 50 to the inner container 10. After removal of the cap 50, the mouth 11 of the inner container 10 and the upper side 35a of the tabular press portion 35 are exposed. Here, with the upper side 35a of the tabular press portion 35 exposed, as illustrated in FIG. 4(a), the latch projecting portion 37 of the tabular press portion 35 has engaged with the engagement recessed portion 13 of the inner container 10. Thus, the inner container 10 has engaged with the outer container 30.

Then, as illustrated in FIG. 4(b), when the upper side 35a of the tabular press portion 35 is pressed to the inner container 10, with the tabular press portion 35 having the supports 36 as fulcrums (refer to FIG. 3(c)), the upper side 35a of the tabular press portion 35 turns inward in the radial direction and moves into the insertion recessed portion 19 and additionally the lower side 35b of the tabular press portion 35 turns outward in the radial direction. Therefore, the latch projecting portion 37 is separated from the engagement recessed portion 13, resulting in release of the engagement between the engagement recessed portion 13 and the latch projecting portion 37.

Here, an increase in the pressing force acting on the tabular press portion 35 causes an increase in the angle of torsion of the supports 36 (refer to FIG. 3(c)), so that damage is likely to occur. Because the ribs 45 extending in the axial direction with the gap 46 outside the tabular press portion 35 in the radial direction are provided at the first flange 41 provided on the outer circumferential portion 15 of the outer container 30, the lower side 35b of the tabular press portion 35 having turned outward in the radial direction abuts on the ribs 45, resulting in limitation of the angle of rotation of the tabular press portion 35, thus, the angle of torsion of the supports 36 is inhibited, so that the supports 36 can be prevented from being damaged.

Simultaneously with turning of the tabular press portion 35, the inner upper-end corner 35c of the tabular press portion 35 abuts on the inclined face 19a, so that an obliquely upward pressing force orthogonal to the inclined face 19a acts on the inclined face 19a. Thus, due to the upward pressing force, the inner container 10 moves upward relatively to the outer container 30. Therefore, the engagement recessed portion 13 moves to the position Pn enabling getting over the latch projecting portion 37. Thus, even when the press operation on the tabular press portion 35 stops, the engagement recessed portion 13 slides on the planar portion 37c or inclined face 37a of the latch projecting portion 37, so that the engagement recessed portion 13 is not caught by the latch projecting portion 37. Therefore, simply, an operation of pulling the inner container 10 from the outer container 30 enables the inner container 10 to be pulled out, so that an operation of pulling out the inner container 10 can be further facilitated.

Because the tabular press portion 35 is provided at the outer container 30, in a case where the upper side 35a of the tabular press portion 35 is pressed to the inner container 10 at the time of removal of the inner container 10, a press operation is made on the tabular press portion 35 with the outer container 30 being held. Thus, when the engagement of the engagement recessed portion 13 is released due to a press operation on the tabular press portion 35, the outer container 30 does not drop off because the outer container 30 is held. In the present embodiment, because a pair of tabular press portions 35 is disposed opposed to each other on both sides in the radial direction of the outer container 30, in a case where a press operation is made on each tabular press portion 35, the press operations are made with the pair of tabular press portions 35 being held, and then the outer container 30 is held through the pair of tabular press portions 35. Thus, when the engagement of the engagement recessed portion 13 is released, the outer container 30 does not drop off.

Note that, in a case where the inner container 10 is removed from the outer container 30, the inner container 10 may be removed from the outer container 30 with the inner lid 21 removed from the inner container 10 or the inner container 10 may be removed from the outer container 30 with the inner lid 21 attached to the inner container 10.

Next, a case where the inner container 10 is attached to the outer container 30 will be given. In a case where any container except the inner container 10 is reused, after removal of the empty inner container 10, a new inner container 10 filled with a content is prepared.

With the bottom portion 16 of the new inner container 10 filled with a content facing the opening side of the outer container 30, the inner container 10 is inserted into the outer container 30. In this case, the engagement projections not illustrated provided at the outer circumferential portion 15 of the inner container 10 fit one-to-one in the latch recessed portions 47 provided on the inner face of the outer circumferential portion 31 of the outer container 30 (refer to FIG. 3(a)). Therefore, the inner container 10 and the outer container 30 are integrally coupled together in the circumferential direction. At the time of insertion of the inner container 10 into the outer container 30, the outer circumferential portion 15 of the inner container 10 moves downward slidingly on the planar portion 37c and inclined face 37a of the latch projecting portion 37 of each tabular press portion 35.

Then, in response to arrival of each engagement recessed portion 13 of the inner container 10 at the position opposed to the corresponding latch projecting portion 37, the lower side 35b of the tabular press portion 35 turns to the inner container 10 side with the supports 36 as fulcrums, so that the latch projecting portion 37 moves into the engagement recessed portion 13, and then the engagement recessed portion 13 engages with the latch projecting portion 37. Therefore, the inner container 10 has engaged with the outer container 30, namely, the inner container 10 cannot be separated from the outer container 30.

After the inner container 10 is housed in the outer container 30, the female thread portion 52a of the cap 50 is screwed with the male thread portion 17 of the inner container 10, resulting in attachment of the cap 50 to the inner container 10, and then the process of replacement of the inner container 10 terminates.

EXAMPLES

Figure 5:
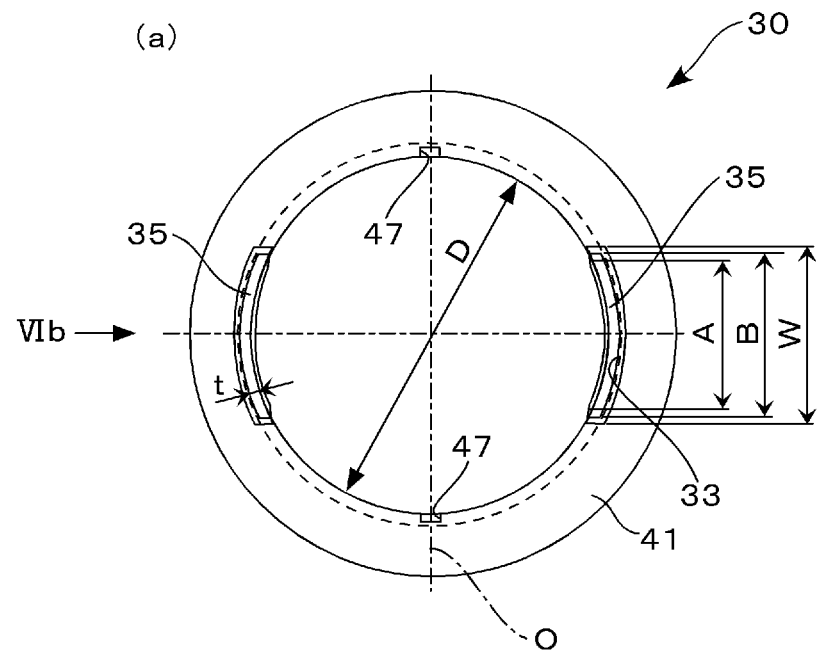
Figure 5:
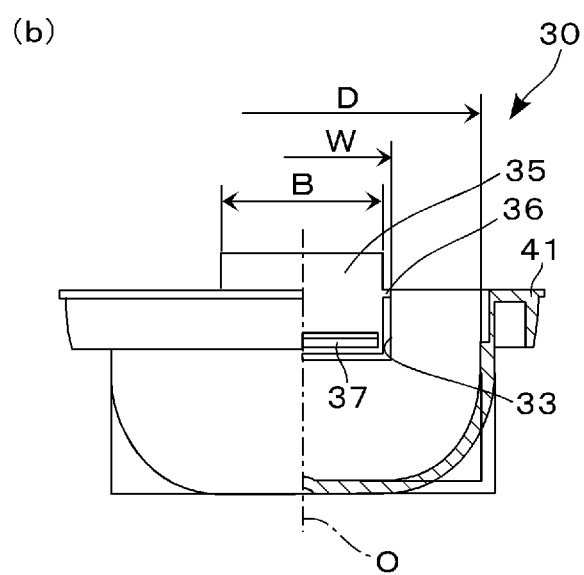

As illustrated in FIG. 5(a), each tabular press portion 35 curves in plan view, however, an excessive increase in the width B of each tabular press portion 35 makes the upper side 35a of the tabular press portion 35 difficult to press to the inner container 10. Thus, the lower side 35b of the tabular press portion 35 is likely to have difficulty in turning. Therefore, for comparison, outer containers 30 different in the shape of tabular press portions 35 were prototyped. Main dimensions of such an outer container 30 are illustrated in FIGS. 5(a) and 5(b).

In FIGS. 5(a) and 5(b),
D represents the inner diameter of the outer container 30,
B represents the width of each tabular press portion 35,
t represents the thickness of each tabular press portion, and
W represents the width of each cut-away portion.
Note that, in the figure, A represents the width of each latch projecting portion 37.

Here, outer containers 30 according to Examples 1 and 2 were prototyped with changes in the four parameters (D, B, t, and W).

In Example 1, selected were the following conditions: D=51 mm, B=23 mm, t=1.5 mm, and W=25 mm (B/D=23 mm/51 mm≈0.45).

In Example 2, selected were the following conditions: D=51 mm, B=18 mm, t=1.5 mm, and W=21 mm (B/D=18 mm/51 mm≈0.35).

In each of Examples 1 and 2, it was found that the operability of the tabular press portions 35 is favorable. B/D larger than 0.45 causes deterioration in the operability of the tabular press portions 35, and B/D smaller than 0.35 makes improvement in the operability of the tabular press portions 35, but the engagement of the inner container 10 tends to deteriorate.

The configuration and functional effect according to the embodiment of the present invention have been described above, but the present invention is not limited to the embodiment.

INDUSTRIAL APPLICABILITY

The present invention enables achievement of a wider range of applications in the field regarding replacement type containers enabling replacement of an inner container to an outer container.

REFERENCE SIGNS LIST 1 replacement type container
3 outer case
5 outer cap
10 inner container
11 mouth
13 engagement recessed portion
15, 31 outer circumferential portion
16, 40 bottom portion
17 male thread portion
18 hook step
19 insertion recessed portion
19a inclined face
21 inner lid
22 hook portion
22a protruding portion
22b hook protruding portion
24 grip
30 outer container
33 cut-away portion
35 tabular press portion
35a upper side of tabular press portion
35b lower side of tabular press portion
35c inner upper-end corner
36 support
37, 44, 59 latch projecting portion
37a inclined face
37b abutment face
37c planar portion
41 first flange
42 first fitting tubular portion
43 first inclined face
45 rib
46 gap
47 latch recessed portion
50 cap
51 top wall portion
52 outer wall portion
52a female thread portion
53 circumferential wall
53a engagement protrusion
54 press step
54a hole
55 second flange
56 hermetic seal
57 second fitting tubular portion
58 second inclined face
60 sealing lid
61 latch protruding portion
61a latch protrusion
63 contact projecting portion
O container axis
Pn position enabling getting over

The invention claimed is:

1. A replacement type container comprising:
an inner container that is tubular in shape with a bottom and that houses a content;
an outer container that houses the inner container; and
a cap detachably attached to a mouth of the inner container, wherein
the outer container has an outer circumferential portion provided with a cut-away portion that extends downward from an upper end of the outer circumferential portion and penetrates in a container radial direction,
a tabular press portion extending in an up-and-down direction and projecting upward from an upper end of the cut-away portion is provided in the cut-away portion,
with the tabular press portion having, as fulcrums, a support connected between an end face on both sides in a circumferential direction and an inner face on both sides in the circumferential direction of the cut-away portion, an upper side of the tabular press portion turns inward in the container radial direction due to a press on the upper side of the tabular press portion and additionally a lower side of the tabular press portion turns outward in the container radial direction, the lower side of the tabular press portion has an inner face provided with a latch projecting portion protruding to the inner container, the inner container has an outer circumferential portion provided with an insertion recessed portion enabling insertion of the upper side of the tabular press portion that turns inward in the container radial direction and an engagement recessed portion that is recessed inward in the container radial direction below the insertion recessed portion and is engageable with the latch projecting portion, and due to movement of the upper side of the tabular press portion into the insertion recessed portion due to the press, engagement between the engagement recessed portion and the latch projecting portion is released.

2. The replacement type container according to claim 1, wherein the insertion recessed portion has, in the container radial direction, an inner upper-end corner provided with an inclined face sloping upward from inside to outside in longitudinal sectional view, and when the upper side of the tabular press portion turns inward in the container radial direction due to the press, an inner upper-end corner of the tabular press portion abuts on the inclined face.

3. The replacement type container according to claim 2, wherein due to upward movement of the inner container to the outer container due to the abutment of the inner upper-end corner of the tabular press portion on the inclined face, the engagement recessed portion moves to a position enabling getting over the latch projecting portion.

4. The replacement type container according to claim 1, wherein the outer container has the outer circumferential portion provided with a rib that extends in the up-and-down direction, with a gap with no press operation on the tabular press portion, outside the tabular press portion in the container radial direction.

5. The replacement type container according to claim 2, wherein the outer container has the outer circumferential portion provided with a rib that extends in the up-and-down direction, with a gap with no press operation on the tabular press portion, outside the tabular press portion in the container radial direction.

6. The replacement type container according to claim 3, wherein the outer container has the outer circumferential portion provided with a rib that extends in the up-and-down direction, with a gap with no press operation on the tabular press portion, outside the tabular press portion in the container radial direction.

* * * * *